United States Patent
Pirmagomedov et al.

(10) Patent No.: US 11,606,739 B2
(45) Date of Patent: Mar. 14, 2023

(54) RE-ROUTING IN AN INTEGRATED ACCESS BACKHAUL NETWORK

(71) Applicant: Nokia Solutions and Networks Oy, Espoo (FI)

(72) Inventors: Rustam Pirmagomedov, Oulu (FI); Ilkka Antero Keskitalo, Oulu (FI); Rauli Jarkko Kullervo Järvelä, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/721,456

(22) Filed: Apr. 15, 2022

(65) Prior Publication Data

US 2022/0338096 A1 Oct. 20, 2022

(30) Foreign Application Priority Data

Apr. 16, 2021 (FI) ...................................... 20215455

(51) Int. Cl.
*H04W 40/28* (2009.01)
*H04L 45/00* (2022.01)

(52) U.S. Cl.
CPC ............. *H04W 40/28* (2013.01); *H04L 45/22* (2013.01)

(58) Field of Classification Search
None
See application file for complete search history.

(56) References Cited

U.S. PATENT DOCUMENTS

| | | | |
|---|---|---|---|
| 2021/0306929 A1* | 9/2021 | Koskinen | H04L 45/28 |
| 2022/0132390 A1* | 4/2022 | Akl | H04L 45/745 |
| 2022/0132393 A1* | 4/2022 | Akl | H04L 45/04 |
| 2022/0132394 A1* | 4/2022 | Akl | H04W 40/22 |

FOREIGN PATENT DOCUMENTS

| | | |
|---|---|---|
| EP | 3806542 A1 | 4/2021 |
| WO | 2019/246350 A1 | 12/2019 |
| WO | 2020/165275 A1 | 8/2020 |

(Continued)

OTHER PUBLICATIONS

"3rd Generation Partnership Project; Technical Specification Group Radio Access Network; NR; Backhaul Adaptation Protocol (BAP) specification (Release 16)", 3GPP TS 38.340, V16.3.0, Dec. 2020, pp. 1-22.

(Continued)

*Primary Examiner* — Brian S Roberts
(74) *Attorney, Agent, or Firm* — Joseph C. Drish; Harrington & Smith

(57) ABSTRACT

An apparatus comprising means for receiving, by an integrated access backhaul node from an integrated access backhaul donor, information for limiting re-routing of data packets over one or more wireless backhaul connections of an integrated access backhaul network; means for receiving, by the integrated access backhaul node, at least one data packet over a first wireless backhaul connection from an originating integrated access backhaul node; means for re-routing, by the integrated access backhaul node, the received at least one data packet over a second wireless backhaul connection based on the received information for limiting re-routing.

8 Claims, 5 Drawing Sheets

502 receiving, by an integrated access backhaul node from an integrated access backhaul donor, information for limiting re-routing of data packets over one or more wireless backhaul connections of an integrated access backhaul network;

504 receiving, by the integrated access backhaul node, at least one data packet over a first wireless backhaul connection from an originating integrated access backhaul node;

506 re-routing, by the integrated access backhaul node, the received at least one data packet to the integrated access backhaul donor over a second wireless backhaul connection based on the received information for limiting re-routing.

(56) References Cited

FOREIGN PATENT DOCUMENTS

WO 2020/166621 A1 8/2020

OTHER PUBLICATIONS

"3rd Generation Partnership Project; Technical Specification Group Radio Access Network; NG-RAN; F1 application protocol (F1AP) (Release 16)", 3GPP TS 38.473, V16.4.0, Jan. 2021, pp. 1-461.
"3rd Generation Partnership Project; Technical Specification Group Radio Access Network; NR; NR and NG-RAN Overall Description; Stage 2 (Release 16)", 3GPP TS 38.300, V16.4.0, Dec. 2020, pp. 1-149.
"3rd Generation Partnership Project; Technical Specification Group Radio Access Network; NR; Study on Integrated Access and Backhaul; (Release 16)", 3GPP TR 38.874, V16.0.0, Dec. 2018, pp. 1-111.
"[AT112-e][031][eIAB] Topology Adaptation (QC)", 3GPP TSG-RAN WG2 Meeting #112-e, R2-2011125, Agenda: 8.4.3, Qualcomm Incorporated, Nov. 2-13, 2020, pp. 1-25.
"Consideration of topology adaptation enhancement for R17 IAB", 3GPP TSG-RAN WG2 Meeting #113-e, R2-2101071, Agenda: 8.4.3, Huawei, Jan. 25-Feb. 5, 2021, pp. 1-11.
"Discussion on Topology Adaptation Enhancements", 3GPP TSG RAN WG2 Meeting #113e, R2-2100359, Agenda: 8.4.3, Intel Corporation, Jan. 25-Feb. 5, 2020, 12 pages.
"Re-routing enhancements in IAB", 3GPP TSG-RAN WG2 Meeting #113 Electronic, R2-2100611, Agenda: 8.4.3, Nokia, Jan. 25-Feb. 5, 2021, 3 pages.

"3rd Generation Partnership Project; Technical Specification Group Radio Access Network; NG-RAN; Architecture description (Release 16)", 3GPP TS 38.401, V16.4.0, Jan. 2021, pp. 1-78.
"Discussion on RLF indication enhancement and local routing for R17-IAB", 3GPP TSG-RAN WG2 Meeting #113-e, R2-2101208, Agenda: 8.4.3, Canon Research Centre France, Jan. 25-Feb. 5, 2021, pp. 1-6.
"On Topology-wide Fairness, Multi-hop Latency and Congestion Mitigation", 3GPP TSG-RAN WG2 Meeting #113-e, R2-2101448, Agenda: 8.4.2, Ericsson, Jan. 25-Feb. 5, 2021, pp. 1-6.
"Topology-wide fairness and Latency enhancements and congestion mitigation", 3GPP TSG-RAN WG2 Meeting #113 electronic, R2-2100902, Agenda: 8.4.2, Sony, Jan. 25-Feb. 5, 2021, 2 pages.
"Report from [Post112-e][066][eIAB] Topology Adaptation (QC)", 3GPP TSG-RAN WG2 Meeting #113e, R2-2100592, Agenda: 8.4.3, Qualcomm Incorporated, Jan. 13, 2021, pp. 1-45.
Office action received for corresponding Finnish Patent Application No. 20215455, dated Oct. 15, 2021, 7 pages.
"Considerations on topology adaptation enhancements in IAB", 3GPP TSG-RAN WG2 Meeting #113 electronic, R2-2101283, Agenda: 8.4.3, ZTE, Jan. 25-Feb. 5, 2021, 8 pages.
Office action received for corresponding Finnish Patent Application No. 20215455, dated Mar. 10, 2022, 5 pages.
International Search Report and Written Opinion received for corresponding Patent Cooperation Treaty Application No. PCT/EP2022/059905, dated Jul. 22, 2022, 13 pages.
"Further consideration of topology adaptation enhancements for eIAB", 3GPP TSG-RAN WG2 #113-e, R2-2100802, Agenda: 8.4.3, Kyocera, Jan. 25-Feb. 5, 2021, 13 pages.
"Routing enhancement for IAB", 3GPP TSG-RAN WG3 Meeting #110-e, R3-206670, Agenda: 13.3.2, Huawei, Nov. 2-12, 2020, 3 pages.

\* cited by examiner

RE-ROUTING IN AN INTEGRATED ACCESS BACKHAUL NETWORK

TECHNICAL FIELD

The present invention relates to the field of wireless communications and, more particularly, to re-routing in an integrated access backhaul network.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Integrated Access and Backhaul (IAB) is a wireless backhaul and access technology introduced by the 3GPP NR Rel-16 for 5th Generation (5G) New Radio (NR). The IAB technology enables extending a radio access network (RAN) with cells provided by IAB-nodes that are connected by wireless backhauls to gNBs, or IAB-donors, of the RAN.

In New Radio, IAB technology relies on split gNB architecture consisting of Centralized Unit (CU) and Distributed Unit (DU) in accordance with the 3GPP TS 38.300 of the Rel. 16 specifications. IAB nodes perform only DU functions, while CU functionality is hosted by an IAB-donor (Donor). For communication with a parent node that may be another IAB-node or an IAB-donor, an IAB-node hosts a Mobile Termination (MT) function corresponding to User Equipment (UE) operation or a part of the UE operation in accordance with the 3GPP TR 38.874 Rel. 16 specifications. IAB-DU is considered a normal cell from the UE perspective.

During IAB operation, backhaul connections may suffer from radio link failures (RLFs). These failures may lead to service interruption and degraded QoS for UEs served by IAB-nodes. In such cases an IAB-node may re-route traffic locally to an alternative connection. However, local re-routing performed IAB-nodes may cause loops, where a data packet is routed through the same IAB-nodes over and over. Such loops entail service interruptions, excess load in the network, and eventually packet losses.

SUMMARY

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

Now, an improved method and technical equipment implementing the method has been invented, by which at least the above problems are alleviated. Various aspects include a method, an apparatus, a computer program and a non-transitory computer readable medium, which are characterized by what is stated in the independent claims. Various details of the embodiments are disclosed in the dependent claims and in the corresponding images and description.

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is provided an apparatus comprising at least one processor and at least one memory, the apparatus being configured to receive, by an integrated access backhaul node from an integrated access backhaul donor, information for limiting re-routing of data packets over one or more wireless backhaul connections of an integrated access backhaul network; receive, by the integrated access backhaul node, at least one data packet over a first wireless backhaul connection from an originating integrated access backhaul node; re-route, by the integrated access backhaul node, the received at least one data packet over a second wireless backhaul connection based on the received information for limiting re-routing.

According to a second aspect there is provided an apparatus comprising at least one processor and at least one memory, said at least one memory stored with computer program code thereon, the at least one memory and the computer program code configured to, with the at least one processor, cause the apparatus at least to perform: receive, by an integrated access backhaul node from an integrated access backhaul donor, information for limiting re-routing of data packets over one or more wireless backhaul connections of an integrated access backhaul network; receive, by the integrated access backhaul node, at least one data packet over a first wireless backhaul connection from an originating integrated access backhaul node; re-route, by the integrated access backhaul node, the received at least one data packet over a second wireless backhaul connection based on the received information for limiting re-routing.

According to an embodiment, the apparatus according to the first and second aspect is configured to disable re-routing, by the integrated access backhaul node, over one or more wireless backhaul connections based on the received information for limiting re-routing of data packets.

According to an embodiment, the apparatus according to the first and second aspect is configured to re-route, by the integrated access backhaul node, the received at least one data packet based on the received information for limiting re-routing, when one or more conditions for re-routing have been met.

According to an embodiment, the apparatus according to the first and second aspect is configured to determine, by the integrated access backhaul node, a third wireless backhaul connection for routing the received at least one data packet; and re-route, by the integrated access backhaul node, based on the received information for limiting re-routing the received at least one data packet over the second wireless backhaul connection based on at least one of a radio link failure and a congestion on the determined third wireless backhaul connection.

According to an embodiment, the apparatus according to the first and second aspect is configured to determine, by the integrated access backhaul node, one or more unallowed wireless backhaul connections for re-routing the received at least one data packet based on the received information for limiting re-routing of data packets; determine, by the integrated access backhaul node, a set of available wireless backhaul connections for re-routing the received at least one data packet based on the determined unallowed wireless backhaul connections; re-route, by the integrated access backhaul node, the received at least one data packet over at least one wireless backhaul connection of the set of available wireless backhaul connections.

According to an embodiment, the apparatus according to the first and second aspect is configured to re-route, by the integrated access backhaul node, the received at least one data packet back to the originating integrated access backhaul node, if the set of available wireless backhaul connections for re-routing the received at least one data packet fails to comprise at least one available wireless backhaul connection.

According to an embodiment, the apparatus according to the first and second aspect is configured to maintain, by the integrated access backhaul node, re-routing limitation information based on the information indicating one or more re-routing limitations comprising information for limiting re-routing of data packets comprises information indicating one or more re-routing limitations over one or more wireless backhaul connections based on one or more identifiers of originating integrated access backhaul nodes.

According to a third aspect, there is provided an apparatus comprising at least one processor and at least one memory, the apparatus being configured to determine, by an integrated access backhaul donor, information for limiting re-routing of data packets over one or more wireless backhaul connections of an integrated access backhaul network; transmit, by an integrated access backhaul donor to one or more integrated access backhaul nodes of the integrated access backhaul network, the determined information for limiting re-routing of data packets.

According to a fourth aspect there is provided an apparatus comprising at least one processor and at least one memory, said at least one memory stored with computer program code thereon, the at least one memory and the computer program code configured to, with the at least one processor, cause the apparatus at least to perform: determine, by an integrated access backhaul donor, information for limiting re-routing of data packets over one or more wireless backhaul connections of an integrated access backhaul network; transmit, by an integrated access backhaul donor to one or more integrated access backhaul nodes of the integrated access backhaul network, the determined information for limiting re-routing of data packets.

According to an embodiment, the apparatus according to the third and fourth aspect is configured to determine, by the integrated access backhaul donor, information for limiting re-routing of data packets, based on a network topology and/or routing configurations of the one or more integrated access backhaul nodes, of the integrated access backhaul network.

According to a fifth aspect there is provided a method comprising: receiving, by an integrated access backhaul node from an integrated access backhaul donor, information for limiting re-routing of data packets over one or more wireless backhaul connections of an integrated access backhaul network;
receiving, by the integrated access backhaul node, at least one data packet over a first wireless backhaul connection from an originating integrated access backhaul node;
re-routing, by the integrated access backhaul node, the received at least one data packet over a second wireless backhaul connection based on the received information for limiting re-routing.

According to a sixth aspect there is provided a method comprising: determining, by an integrated access backhaul donor, information for limiting re-routing of data packets over one or more wireless backhaul connections of an integrated access backhaul network;
transmitting, by the integrated access backhaul donor to one or more integrated access backhaul nodes of the integrated access backhaul network, the determined information for limiting re-routing of data packets.

According to a seventh aspect there is provided a computer program comprising instructions for causing an apparatus to perform at least the following:
receiving, by an integrated access backhaul node from an integrated access backhaul donor, information for limiting re-routing of data packets over one or more wireless backhaul connections of an integrated access backhaul network;
receiving, by the integrated access backhaul node, at least one data packet over a first wireless backhaul connection from an originating integrated access backhaul node; re-routing, by the integrated access backhaul node, the received at least one data packet over a second wireless backhaul connection based on the received information for limiting re-routing.

According to an eighth aspect there is provided a non-transitory computer readable medium comprising program instructions for causing an apparatus to perform at least the following:
receiving, by an integrated access backhaul node from an integrated access backhaul donor, information for limiting re-routing of data packets over one or more wireless backhaul connections of an integrated access backhaul network;
receiving, by the integrated access backhaul node, at least one data packet over a first wireless backhaul connection from an originating integrated access backhaul node; re-routing, by the integrated access backhaul node, the received at least one data packet over a second wireless backhaul connection based on the received information for limiting re-routing.

According to a ninth aspect there is provided a computer program comprising instructions for causing an apparatus to perform at least the following:
determining, by an integrated access backhaul donor, information for limiting re-routing of data packets over one or more wireless backhaul connections of an integrated access backhaul network;
transmitting, by the integrated access backhaul donor to one or more integrated access backhaul nodes of the integrated access backhaul network, the determined information for limiting re-routing of data packets.

According to a tenth aspect there is provided a non-transitory computer readable medium comprising program instructions for causing an apparatus to perform at least the following:
determining, by an integrated access backhaul donor, information for limiting re-routing of data packets over one or more wireless backhaul connections of an integrated access backhaul network;
transmitting, by the integrated access backhaul donor to one or more integrated access backhaul nodes of the integrated access backhaul network, the determined information for limiting re-routing of data packets.

BRIEF DESCRIPTION OF THE DRAWINGS

For a more complete understanding of the example embodiments, reference is now made to the following descriptions taken in connection with the accompanying drawings in which.

DETAILED DESCRIPTION OF SOME EXAMPLE EMBODIMENTS

The following describes in further detail suitable apparatus and possible mechanisms for limiting re-routing in integrated access backhaul network. While the following focuses on 5G networks, the embodiments as described further below are by no means limited to be implemented in said networks only, but they are applicable in any network incorporating integrated access backhauls.

Use of ordinal terms such as "first," "second," "third," etc., in the claims and description to modify a described feature does not by itself connote any priority, precedence, or order of one described feature over another or the temporal order in which acts of a method are performed, but are used merely as labels to distinguish one described feature having a certain name from another described feature having a same name (but for use of the ordinal term) to distinguish the described feature.

In the following, different exemplifying embodiments will be described using, as an example of an access architecture to which the embodiments may be applied, a radio access architecture based on Long Term Evolution Advanced (LTE Advanced, LTE-A) or new radio (NR, 5G), without restricting the embodiments to such an architecture, however. A person skilled in the art appreciates that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet protocol multimedia subsystems (IMS) or any combination thereof. The communication network or the radio access architecture may also be a future network or architecture, being planned and/or specified, such as so called 6G network/radio access architecture.

Figure 1:
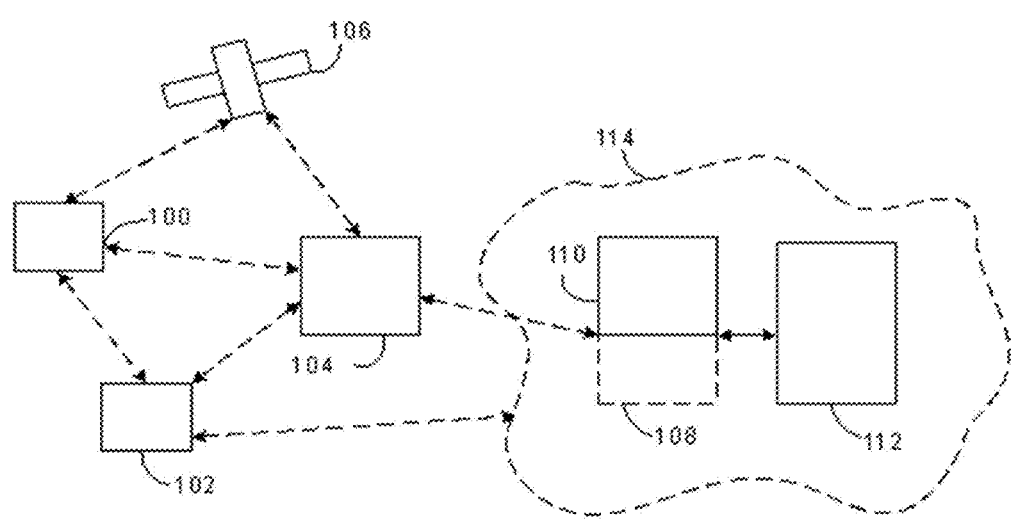
FIG. 1 shows a part of an exemplifying radio access network.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1. The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. The CN may comprise network entities or nodes that may be referred to management entities. Examples of the network entities comprise at least an Access and Mobility Management Function (AMF).

The user device, also called a user equipment (UE), a user terminal, a terminal device, a wireless device, a mobile station (MS) etc., illustrates one type of an apparatus to which resources on the air interface are allocated and assigned, and thus any feature described herein with a user device may be implemented with a corresponding network apparatus, such as a relay node, an eNB, and an gNB. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. Accordingly, the user device may be an IoT-device. The user device may also utilize cloud. In some applications, a user device may comprise a small portable device with radio parts (such as a watch, earphones or eyeglasses) and the computation is carried out in the cloud.

The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. The access nodes of the radio network form transmission/reception (TX/Rx) points (TRPs), and the UEs are expected to access networks of at least partly overlapping multi-TRPs, such as macro-cells, small cells, pico-cells, femto-cells, remote radio heads, relay nodes, etc. The access nodes may be provided with Massive MIMO antennas, i.e. very large antenna array consisting of e.g. tens or hundreds of antenna elements, implemented in a single antenna panel or in a plurality of antenna panels, capable of using a plurality of simultaneous radio beams for communication with the UE. The UEs may be provided with MIMO antennas having an antenna array consisting of plurality of antenna elements a.k.a. patches, implemented in a single antenna panel or in a plurality of antenna panels. Thus, the UE may access one TRP using one beam, one TRP using a plurality of beams, a plurality of TRPs using one (common) beam or a plurality of TRPs using a plurality of beams.

5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network.

The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (e.g. in a distributed unit, DU) and non-real time functions being carried out in a centralized manner (e.g. in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well. The gNB is a next generation Node B (or, new Node B) supporting the 5G network (i.e., the NR).

5G may also utilize non-terrestrial nodes 106, e.g. access nodes, to enhance or complement the coverage of 5G service, for example by providing backhauling, wireless access to wireless devices, service continuity for machine-to-machine (M2M) communication, service continuity for Internet of Things (IoT) devices, service continuity for passengers on board of vehicles, ensuring service availability for critical communications and/or ensuring service availability for future railway/maritime/aeronautical communications. The non-terrestrial nodes may have fixed positions with respect to the Earth surface or the non-terrestrial nodes may be mobile non-terrestrial nodes that may move with respect to the Earth surface. The non-terrestrial nodes may comprise satellites and/or High Altitude Platforms Stations (HAPS s). Satellite communication may utilize geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node 104 or by a gNB located on-ground or in a satellite.

A person skilled in the art appreciates that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells, or so-called small cells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

The actual user and control data from network to the UEs is transmitted via downlink physical channels, which in 5G include Physical downlink control channel (PDCCH) which carries the necessary downlink control information (DCI), Physical Downlink Shared Channel (PDSCH), which carries the user data and system information for user, and Physical broadcast channel (PBCH), which carries the necessary system information to enable a UE to access the 5G network.

The user and control data from UE to the network is transmitted via uplink physical channels, which in 5G include Physical Uplink Control Channel (PUCCH), which is used for uplink control information including HARQ feedback acknowledgments, scheduling request, and downlink channel-state information for link adaptation, Physical Uplink Shared Channel (PUSCH), which is used for uplink data transmission, and Physical Random Access Channel (PRACH), which is used by the UE to request connection setup referred to as random access.

Frequency bands for 5G NR are separated into two frequency ranges: Frequency Range 1 (FR1) including sub-6 GHz frequency bands, i.e. bands traditionally used by previous standards, but also new bands extended to cover potential new spectrum offerings from 410 MHz to 7125 MHz, and Frequency Range 2 (FR2) including frequency bands from 24.25 GHz to 52.6 GHz. Thus, FR2 includes the bands in the mmWave range, which due to their shorter range and higher available bandwidth require somewhat different approach in radio resource management compared to bands in the FR1.

Coverage is a fundamental aspect of cellular network deployments. As NR moves to higher frequencies (around and above 4 GHz for FR1 deployments and above 24 GHz for FR2), propagation conditions degrade compared to lower frequencies, thereby causing further coverage challenges. Mobile operators typically try to solve the problem by increasing the densification of cells by including different types of network nodes in their deployments. While the deployment of regular full-stack cells is preferred, it may not be always a possible (e.g., due to non-availability of backhaul) or economically viable option.

As a result, new types of network nodes have been considered to increase mobile operators' flexibility for their network deployments. NR Rel-16 has introduced a new type of network node not requiring a wired backhaul referred to as Integrated Access and Backhaul (IAB). The usage of wireless connection for the backhaul (BH)/fronthaul (FH) eliminates the need for cabling of all sites in the deployed network (which can be very dense), which would dramatically reduce the initial deployment costs. Naturally, wired backhaul connection not an option with moving relays. The only option is to utilize wireless connection for which IAB will provide a feasible basis.

Figure 2:
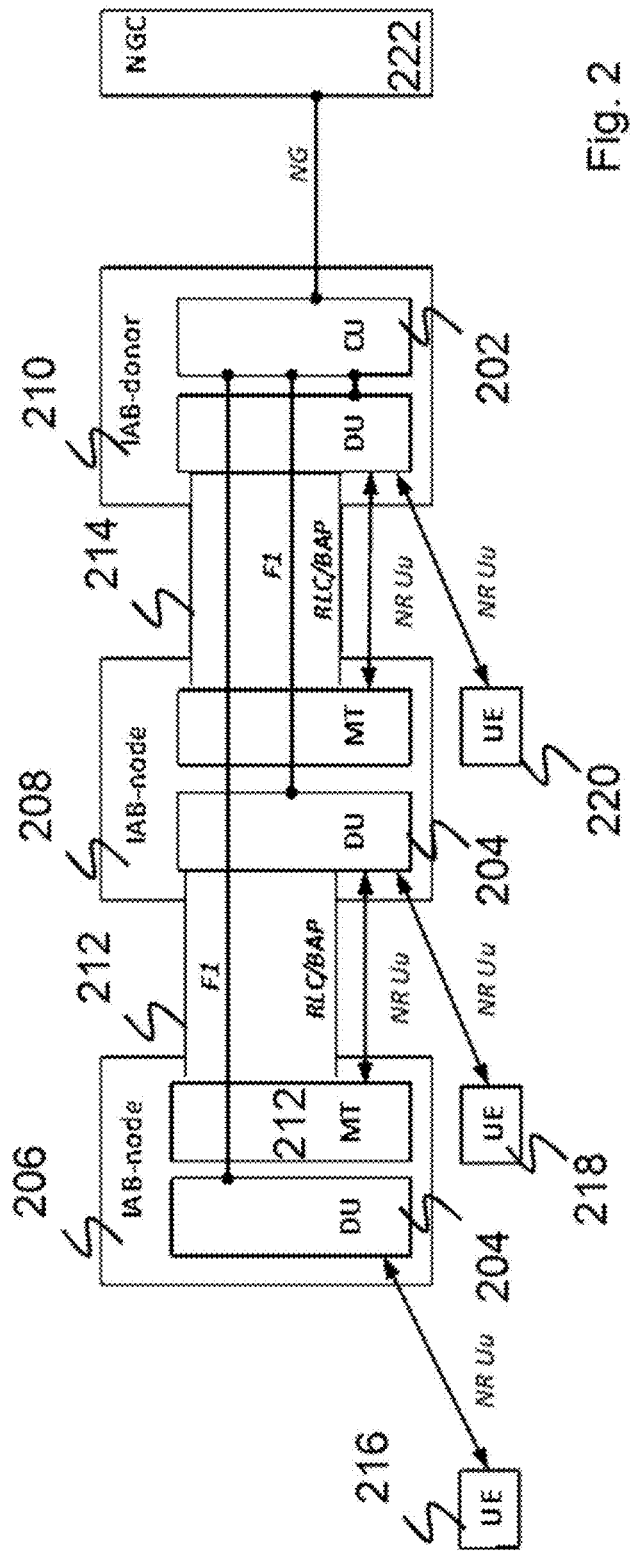
FIG. 2 illustrates an example of IAB network architecture.

FIG. 2 illustrates an example architecture for an IAB network. The IAB network is a radio access network configured to support wireless backhauling and a split architecture of radio access nodes, or gNBs. It should be noted, that the IAB network is described in the context of the 3GPP Rel-16 NR specifications. The split gNB architecture consists of Centralized Unit (CU), i.e. IAB-CU, 202 and Distributed Unit (DU) 204, i.e. IAB-DU, in accordance with the 3GPP TS 38.300 Rel. 16 specifications. IAB nodes 206,208 perform only DU functions, while CU functionality is hosted by IAB-donor (Donor) 210. For communication with a parent node an IAB-node hosts a Mobile Termination (MT) function 212, i.e. IAB-MT, corresponding to UE operation or a part of the UE operation described in the 3GPP TR 38.874 Rel. 16 specifications. IAB-DU 204 serves one or more cells the same way as a regular DU with a fixed (non-wireless) connection to the CU. IAB-DU served cell is considered a normal cell from the UE perspective. Accordingly, UE 216,218,220 may connect to the IAB network via cells provided by the IAB-nodes 206,208. It should be noted that the parent node may refer to a serving node providing a wireless backhaul connection 212,214 to a given IAB-node 206, 208, whereby the parent node may be another IAB-node or the IAB-donor. The IAB-DU and IAB-Donor-CU may be connected by F1 interface and the Backhaul Adaptation protocol on top of the Radio Link Control (RLC) protocol may be used for forwarding Internet Protocol (IP) data packets between over wireless backhaul connections 212, or hops, between IAB-nodes and also between a wireless backhaul connection 214 between the IAB-nodes and the IAB-donor. Accordingly, BAP data is carried by backhaul Radio Link Control (RLC) channels on each NR backhaul link, or hop, between the IAB-nodes and/or the IAB nodes and the IAB-donor. The parent IAB-DU and the IAB-MT may be connected by Nr Uu interface. In a standalone (SA) NR RAN, the IAB-donor is connected to the next generation core NGC 222 over NG interface, whereby communications of user data of the UEs 216,218,220 with devices outside of the IAB network is supported.

Figure 3:
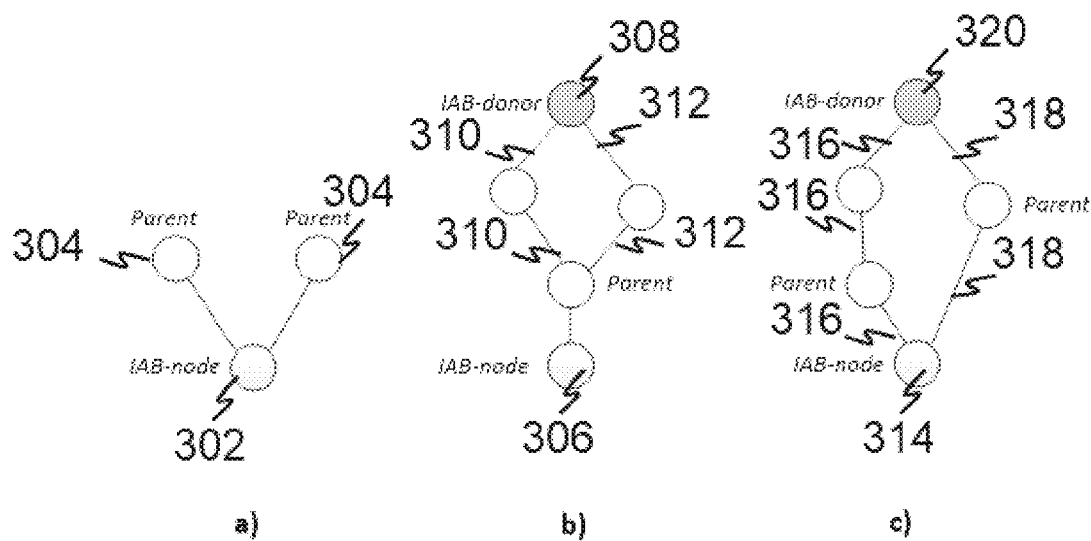
FIG. 3 illustrates an example of link redundancy and route redundancy of an IAB network.

FIG. 3 illustrates an example of link redundancy and route redundancy of an IAB network. The link redundancy and route redundancy provides that a data packet at an IAB-node 302 may have more than one route towards an IAB-donor though the IAB network. Example a) of FIG. 3 illustrates a multi-connected IAB-node, where a data packet at an IAB-node 302 may be transmitted, or forwarded, to different parent nodes 303,304 over wireless backhaul connections to the IAB-nodes. In this case the IAB-node may perform local routing and re-routing, where the wireless backhaul connection for forwarding the data packet is selected from the available wireless backhaul connections. The wireless backhaul connections to the parent nodes provide link redundancy. Example b) of FIG. 3 illustrates an IAB-node 306 having redundant routes 310,312 to an IAB-donor 308. The routes may comprise one or more hops between IAB-nodes. The IAB-node 306 is connected to one parent node and a parent node of the IAB-node may perform local routing and re-routing of the data packet. The routes provide route redundancy. Example c) of FIG. 3 illustrates an IAB-node 314 having redundant routes 316,318 to an IAB-donor 320. The routes may comprise one or more hops between IAB-nodes. Here the IAB-node 314 is a multi-connected IAB node in accordance with the example a) whereby the link redundancy is provided. Additionally, the routes provide route redundancy in accordance with the example b).

Figure 4:
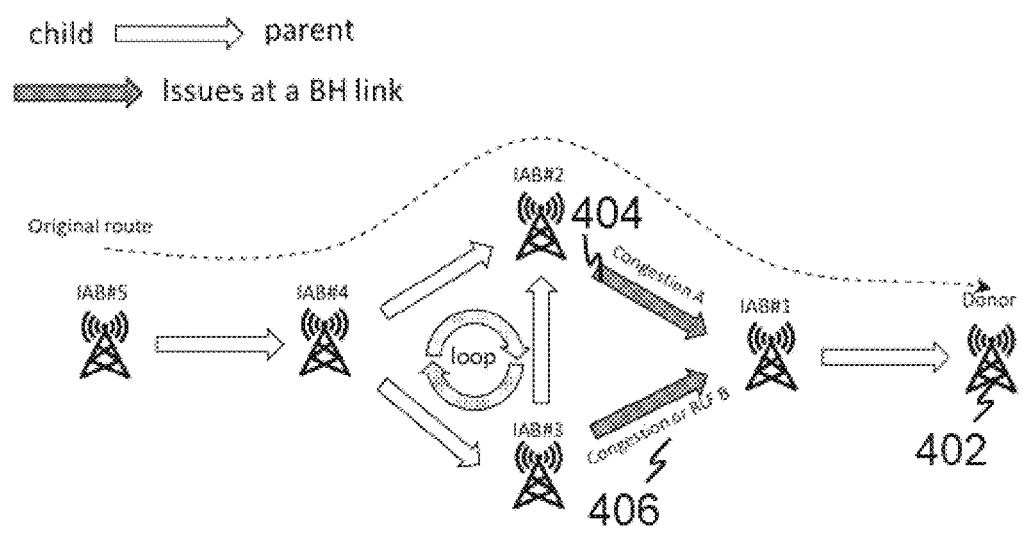
FIG. 4 illustrates an example of a routing loop in an IAB network.

FIG. 4 illustrates an example of a routing loop in an IAB network. The IAB network comprises IAB-nodes, IAB #1, IAB #2, IAB #3, IAB #4 and IAB #5, connected to an IAB-donor 402. The IAB network may support link redundancy and route redundancy in accordance with the examples described with FIG. 3. The IAB-nodes may perform local routing and re-routing of received data packets for example based on detecting a radio link failure on a wireless backhaul connection, detecting congestion a wireless backhaul connection and/or performing load balancing between wireless backhaul connections. The routing and re-routing causes an IAB-node to select a wireless backhaul connection, where a data packet at an IAB-node is forwarded towards the IAB-donor. The IAB-donor has information of a topology of the IAB network, whereby the IAB-donor may determine link redundancy and route redundancy of the IAB network. Additionally, the IAB-donor may have information of congestion in parts of the IAB network, e.g. congestion over one or more wireless backhaul connections. However, the IAB-nodes may not have the topology or congestion information. Furthermore, IAB routing may support forwarding packets from one child BH link to another child BH link. Similarly, IAB routing may happen between two parent BH connections. Considering the available routing possibilities, local routing and re-routing of data packets at the IAB-nodes may cause loops, where a data packet is routed or re-routed based on local routing performed by the IAB-nodes through the IAB network, whereby the data packets is received more than once at an IAB-node.

To illustrate loops caused by re-routing in the IAB network, let us consider an example in FIG. 4, where UL data, e.g. one or more data packets, are travelling from IAB #5 to the IAB-donor using a route: IAB #5->IAB #4->IAB #2->IAB #1->IAB-donor. Due to congestion A 404, IAB #2 may perform local re-routing of the UL data to IAB #3. However, IAB #3 may experience congestion or RLF B 406 and re-route the UL data to IAB #4 and a path consisted of IAB #4->IAB #2->IAB #1->IAB-donor, which results in a loop between IAB #2, IAB #3, IAB #4. Consequently, there is a need to control local re-routing performed by the IAB-nodes in order to avoid loops and redundant data transmissions. In accordance with at least some embodiments described herein, the IAB-nodes are provided information for limiting re-routing, which controlling the re-routing performed by the IAB-nodes, whereby loops in the IAB network may be avoided.

As a first aspect for at least alleviating the above problems, an apparatus is herein introduced, said apparatus comprising means for receiving, by an integrated access backhaul node from an integrated access backhaul donor, information for limiting re-routing of data packets over one or more wireless backhaul connections of an integrated access backhaul network; means for receiving, by the integrated access backhaul node, at least one data packet over a first wireless backhaul connection from an originating integrated access backhaul node; means for re-routing, by the integrated access backhaul node, the received at least one data packet over a second wireless backhaul connection based on the received information for limiting re-routing. Examples of the apparatus comprise an IAB-node or a part of an IAB-node.

As a further aspect for at least alleviating the above problems, an apparatus is herein introduced, said apparatus comprising means for determining, by an integrated access backhaul donor, information for limiting re-routing of data packets over one or more wireless backhaul connections of an integrated access backhaul network; means for transmitting, by the integrated access backhaul donor to one or more integrated access backhaul nodes of the integrated access backhaul network, the determined information for limiting re-routing of data packets. Examples of the apparatus comprise an IAB-donor or a part of an IAB-donor.

Figure 5:
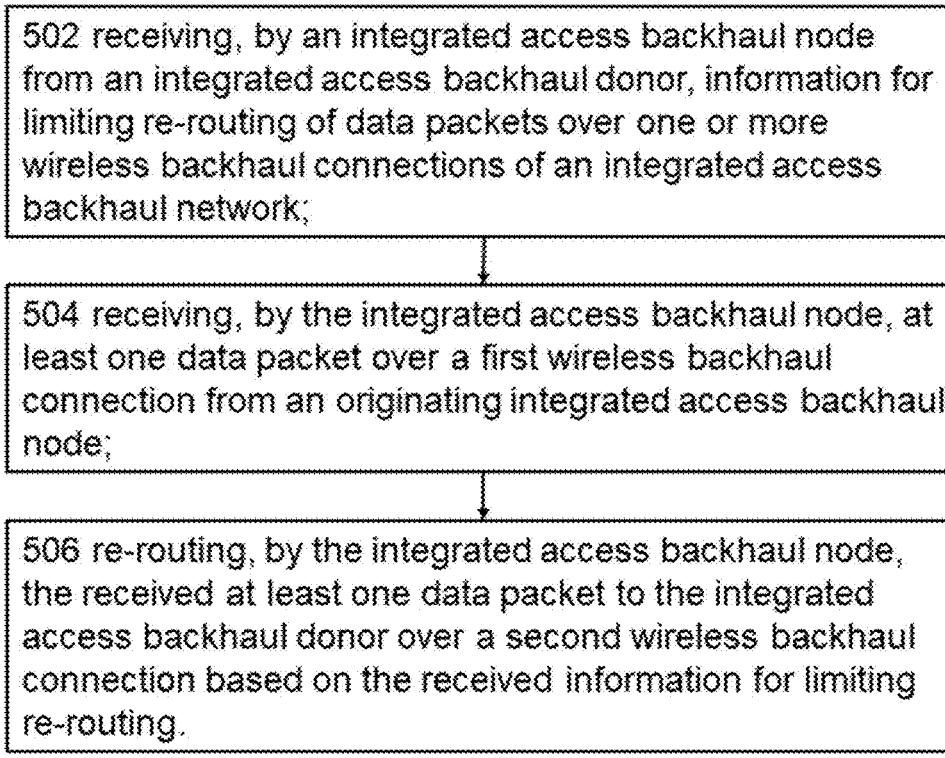
FIG. 5 illustrates an example of a method for an integrated access backhaul node.

FIG. 5 illustrates an example of a method for an integrated access backhaul node. The method provides controlling re-routing of data packets at integrated access backhaul nodes. The method may be performed by an IAB-node or a part of the IAB-node.

Phase 502 comprises receiving, by an integrated access backhaul node from an integrated access backhaul donor, information for limiting re-routing of data packets over one or more wireless backhaul connections of an integrated access backhaul network.

Phase 504 comprises receiving, by the integrated access backhaul node, at least one data packet over a first wireless backhaul connection from an originating integrated access backhaul node.

Phase 506 comprises re-routing, by the integrated access backhaul node, the received at least one data packet over a second wireless backhaul connection based on the received information for limiting re-routing.

In an example, phase 506 comprises re-routing the received at least one data packet over a second wireless backhaul connection towards a configured destination. The configured destination may be the integrated access backhaul donor or an integrated access backhaul node.

In an example, re-routing in phase 506 may be performed after determining a need, or at least one condition, to modify a routing of the received at least one data packet, or to modify the routing. The routing may be defined by a routing configuration of the integrated access backhaul node. In an example of determining the need, phase 506 may comprise that the integrated access backhaul node may determine a routing for the received at least one data packet and the determined routing is modified. Accordingly, instead of forwarding the received at least one data packet based on the determined routing, the integrated access backhaul node may modify the determined routing of the at least one data packet, or re-route the received at least one data packet. The re-routing may be performed, when one or more conditions for re-routing have been met.

In an embodiment, phase 506 comprises re-routing, by the integrated access backhaul node, the received at least one data packet based on the received information for limiting re-routing, when one or more conditions for re-routing have been met. The conditions provide determining when the re-routing limitations may be applied at an integrated access backhaul node. Examples of the one or more conditions comprise a radio link failure and a congestion on a wireless backhaul connection. The radio link failure the congestion may be determined from wireless backhaul connection that is selected for routing towards the integrated access backhaul donor based on a destination information derived from the at least one data packet.

In an example, phase 504 comprises that the originating integrated access backhaul node is an integrated access backhaul node that has forwarded the at least data packet over the first wireless backhaul connection to the receiving integrated access backhaul node.

In an example, phase 504, the at least one data packet may comprise user data or or IAB-node data. The user data may comprise downlink user data destined to a UE served by an integrated access backhaul node of the integrated access backhaul network or uplink user data towards the integrated access backhaul donor. The IAB-node data may be data that is originating from one IAB-node and destined to another IAB-node.

In an example, phase 504 comprises that the received at least data packet is travelling through the IAB-network towards the IAB-donor. In another example, the received at least data packet is travelling through the IAB-network towards an IAB node of the IAB-network Therefore, it should be noted that phase 506 may comprise re-routing the received at least one data packet towards the IAB-donor or IAB node over the second wireless backhaul connection.

In an embodiment, phase 506 comprises disabling re-routing, by the integrated access backhaul node, over one or more wireless backhaul connections based on the received information for limiting re-routing of data packets. In this way available wireless backhaul connections for re-routing may be reduced.

In an embodiment, phase 506 comprises maintaining, by the integrated access backhaul node, re-routing limitation information based on the information indicating one or more re-routing limitations comprising information for limiting re-routing of data packets comprises information indicating one or more re-routing limitations over one or more wireless backhaul connections based on one or more identifiers of originating integrated access backhaul nodes. Examples of the re-routing limitation information comprise re-routing limitation information towards one or more integrated access backhaul donors and/or one or more integrated access backhaul nodes. An example of the re-routing limitation information is given in Table 1 below.

TABLE 1

Re-routing limitation information for loop prevention

| Column 1 Destination (BAP address) | Column 2 Path ID | Column 3 Re-routing limitations (re-routing is not allowed for packets arrived from the neighbours listed in this field) |
|---|---|---|
| Donor DU BAP address | 1 2 3 | IAB#1 IAB#2, IAB#1 |

The Re-routing limitation information in Table 1 is arranged in columns, where Column 1 comprises BAP address of an IAB-donor DU, Column 2 comprises a path identifier (Path ID) and Column 3 comprises re-routing limitations. The re-routing limitations in Column 3 are defined based on BAP addresses of neighboring IAB-nodes. Accordingly, the neighboring IAB-nodes of the IAB-nodes comprise IAB-nodes that are one hop away from the IAB-node. Accordingly, the neighbors are connected by wireless backhaul connections to the IAB-node. The Path ID refers to a wireless backhaul connection, or hop, where the IAB-node may route and re-route data packets.

Figure 6:
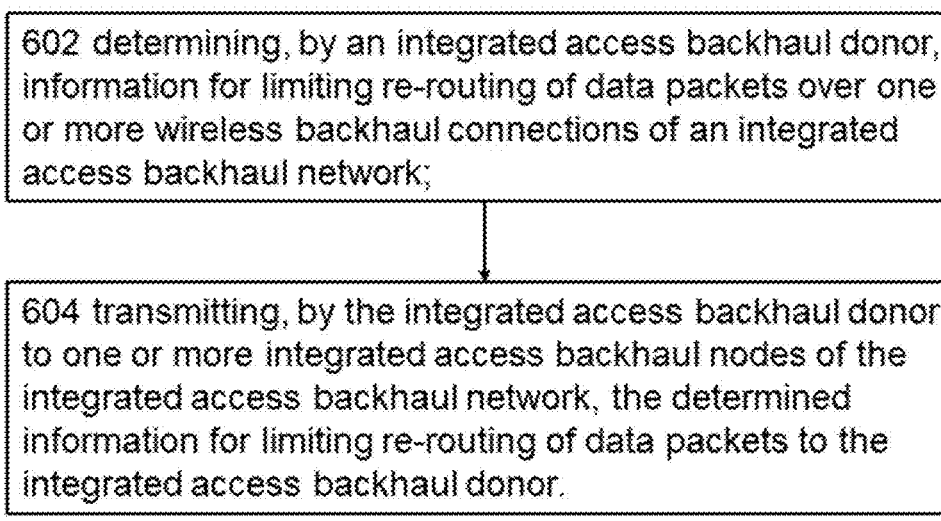
FIG. 6 illustrates an example of a method for an integrated access backhaul donor.

FIG. 6 illustrates an example of a method for an integrated access backhaul donor. The method provides controlling re-routing of data packets at integrated access backhaul nodes. The method may be performed by an IAB-donor or a part of the IAB-donor.

Phase 602 comprises determining, by an integrated access backhaul donor, information for limiting re-routing of data packets over one or more wireless backhaul connections of an integrated access backhaul network.

Phase 604 comprises transmitting, by the integrated access backhaul donor to one or more integrated access backhaul nodes of the integrated access backhaul network, the determined information for limiting re-routing of data packets.

In an embodiment, phase 602 comprises determining by the integrated access backhaul donor, information for limiting re-routing of data packets, based on a network topology and/or routing configurations of integrated access backhaul nodes, of the integrated access backhaul network. In this way the integrated access backhaul nodes may be provided with information for controlling re-routing at the integrated access backhaul nodes, without a need to share the network topology with the integrated access backhaul nodes.

In an example, phase 602 may comprise that the determined information for limiting re-routing of data packets is for limiting re-routing of data packets at the one or more integrated access backhaul nodes. The re-routing may be performed towards a configured destination. The configured destination may be the integrated access backhaul donor or an integrated access backhaul node.

In an example, in phase 604, the determined information for limiting re-routing of data packets may be provided to one or more integrated access backhaul nodes using backhaul Routing Configuration via an F1-AP message examples of which are described in the 3GPP TS 38.473 Rel. 16 specifications. For this purpose, a BAP mapping configuration message and/or a BAP mapping configuration remove message may comprise one or more Information Elements (IEs) that comprise information for limiting re-routing of data packets over one or more wireless backhaul connections of an integrated access backhaul network and/or information for limiting re-routing of data packets to one or more integrated access backhaul nodes. Accordingly, the information for limiting re-routing may cause that local re-routing alternatives at one or more integrated access backhaul nodes are limited. The IEs may be existing IEs that are enhanced, or new IEs introduced to carry the information for limiting re-routing of data packets within BAP mapping configuration entities. One example of implementing the phase 604 includes a modifying a BAP Routing Identifier (ID) IE described in Section 9.3.1.110, TS 38.473 Rel. 16 specifications. An example of the modified BAP Routing ID IE is shown in Table 2, where the modifications are underlined. In the example of Table 2, the BAP Routing ID IE indicates a BAP address and a Path ID and a maximum number of neighbour integrated access backhaul nodes, maxnoofNeighbours, for which re-routing limitation information is supported. A BAP address included in the modified BAP Routing ID IE indicates the integrated access backhaul node that data packets originating from the BAP address cannot be re-routed to the Path ID. Table 3 gives a definition for the Range of the BAP Routing ID IE. If the integrated access backhaul node has received the modified BAP Routing ID IE for a given Path ID from each of its neighbour integrated access backhaul nodes, the Path ID cannot be used for re-routing of data packets, whereby re-routing over the Path ID is disabled.

TABLE 2

BAP routing ID IE modification

| IE/Group Name | Presence | Range | IE type and reference | Semantics description |
|---|---|---|---|---|
| BAP Address | M | | 9.3.1.111 | |
| Path ID | M | | BAP Path ID 9.3.1.112 | |
| Local re-routing not allowed | O | 0 ... <maxnoof Neighbours> | 9.3.1.111 | Each entry of this type contains a BAP address of neighbour IAB-node (bap-Address-r16 defined in subclause 6.2.2 or subclause 6.3.2 of TS 38.331) packets from which can't be re-routed to this path |

TABLE 3

BAP routing ID IE Range definition

| Range bound | Explanation |
|---|---|
| maxnoofNeighbours | A maximum number of neighbour IAB-nodes. If there IEs for each neighbour, it is mean that this path is not allowed to use for any re-routing |

Figure 7:
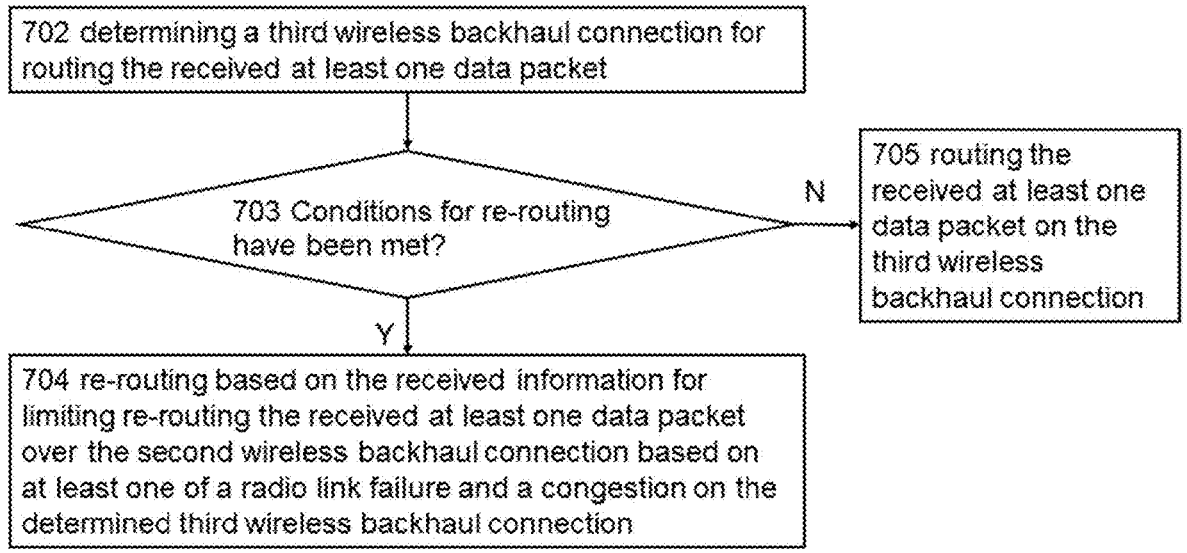
FIG. 7 illustrates an example of a method for determining re-routing.

FIG. 7 illustrates an example of a method for determining re-routing. The method provides determining, when re-routing limitations may be applied at an integrated access backhaul node. The method may be performed by an IAB-node or a part of the IAB-node e.g. in connection with one or more phases of FIG. 5.

Phase 702 comprises determining a third wireless backhaul connection for routing the received at least one data packet.

Phase 703 comprises determining if one or more conditions for re-routing have been met. The conditions may comprise one or more of a radio link failure and a congestion on the determined third wireless backhaul connection. If at least one condition has been met, the method proceeds to phase 704. Otherwise, the method proceeds to phase 705.

Phase 704 comprises re-routing based on the received information for limiting re-routing the received at least one data packet over the second wireless backhaul connection based on at least one of the radio link failure and the congestion on the determined third wireless backhaul connection. In this way the re-routing may be controlled by limiting the re-routing based on the received information for limiting re-routing. In an example phase 704 may comprise that the re-routing is performed based on the received information for limiting re-routing and a routing configuration of the integrated access backhaul node.

Phase 705 comprises routing the received at least one data packet on the third wireless backhaul connection. In this case the routing may be performed without re-routing and limiting the re-routing.

Figure 8:
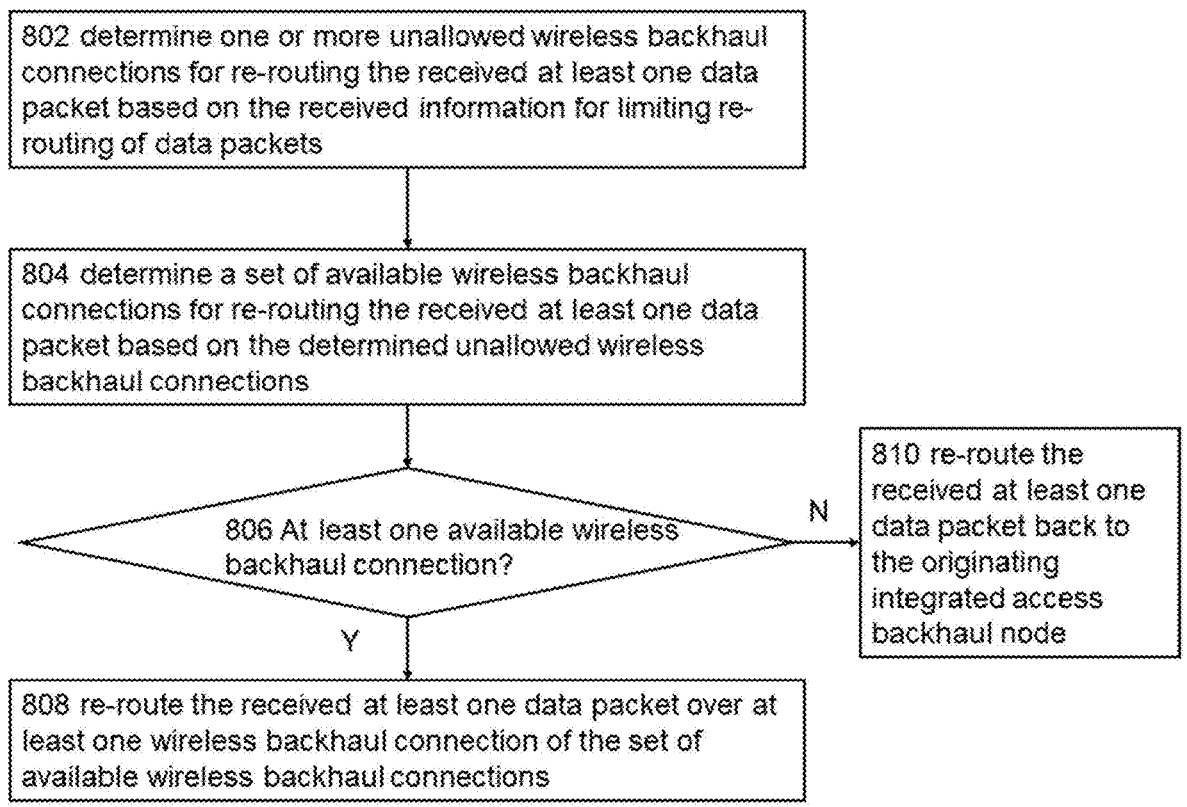
FIG. 8 illustrates an example of a method for determining re-routing based on available wireless backhaul connections.

FIG. 8 illustrates an example of a method for determining re-routing based on available wireless backhaul connections. The method supports re-routing received data packets using a limited number of available wireless backhaul connections and even in a case without available wireless backhaul connections. The method may be performed by an IAB-node or a part of the IAB-node e.g. in connection with one or more phases of FIG. 5.

Phase 802 comprises determining one or more unallowed wireless backhaul connections for re-routing the received at least one data packet based on the received information for limiting re-routing of data packets.

Phase 804 comprises determining a set of available wireless backhaul connections for re-routing the received at least one data packet based on the determined unallowed wireless backhaul connections. It should be noted that the set may comprise any number of available wireless backhaul connections.

Phase 806 comprises determining if the set of available wireless backhaul connections for re-routing the received at least one data packet comprises at least one available wireless backhaul connection. If yes, the method proceeds to phase 808. If not the method proceeds to phase 810.

Phase 808 comprises re-routing the received at least one data packet over at least one wireless backhaul connection of the set of available wireless backhaul connections. In this way the at least one data packet may be re-routed based on the received information for limiting re-routing.

Phase 810 comprises routing the received at least one data packet back to the originating integrated access backhaul node, if the set of available wireless backhaul connections for re-routing the received at least one data packet fails to comprise at least one available wireless backhaul connection. In this way, the at least one data packet may be re-routed even if based on the received information for limiting re-routing, there would be no available wireless backhaul connections for re-routing the received at least one data packet.

The method and the embodiments related thereto may be implemented in an apparatus implementing a network node, such as an IAB node and an IAB-donor. The apparatus may comprise at least one processor and at least one memory, said at least one memory stored with computer program code thereon, the at least one memory and the computer program code configured to, with the at least one processor, cause the apparatus at least to perform a method described with an example described herein. Such apparatuses may comprise e.g. the functional units disclosed in any of the FIGS. 1 and 2 for implementing the embodiments.

The method and the embodiments related thereto may likewise be implemented in an apparatus comprising means for receiving, by an integrated access backhaul node from an integrated access backhaul donor, information for limiting re-routing of data packets over one or more wireless backhaul connections of an integrated access backhaul network; means for receiving, by the integrated access backhaul node, at least one data packet over a first wireless backhaul connection from an originating integrated access backhaul node; means for re-routing, by the integrated access backhaul node, the received at least one data packet over a second wireless backhaul connection based on the received information for limiting re-routing.

According to an embodiment, the apparatus comprises means for disabling re-routing, by the integrated access backhaul node, over one or more wireless backhaul connections based on the received information for limiting re-routing of data packets.

According to an embodiment, the apparatus comprises means for re-routing, by the integrated access backhaul node, the received at least one data packet based on the received information for limiting re-routing, when one or more conditions for re-routing have been met.

According to an embodiment, the apparatus comprises means for determining, by the integrated access backhaul node, a third wireless backhaul connection for routing the received at least one data packet; and means for re-routing, by the integrated access backhaul node, based on the received information for limiting re-routing the received at least one data packet over the second wireless backhaul connection based on at least one of a radio link failure and a congestion on the determined third wireless backhaul connection.

According to an embodiment, the apparatus comprises means for determining, by the integrated access backhaul node, one or more unallowed wireless backhaul connections for re-routing the received at least one data packet based on the received information for limiting re-routing of data packets; means for determining, by the integrated access backhaul node, a set of available wireless backhaul connections for re-routing the received at least one data packet based on the determined unallowed wireless backhaul connections; means for re-routing, by the integrated access backhaul node, the received at least one data packet over at least one wireless backhaul connection of the set of available wireless backhaul connections.

According to an embodiment, the apparatus comprises means for re-routing, by the integrated access backhaul node, the received at least one data packet back to the originating integrated access backhaul node, if the set of available wireless backhaul connections for re-routing the received at least one data packet fails to comprise at least one available wireless backhaul connection.

According to an embodiment, the apparatus comprises means for maintaining, by the integrated access backhaul node, re-routing limitation information based on the information indicating one or more re-routing limitations comprising information for limiting re-routing of data packets comprises information indicating one or more re-routing limitations over one or more wireless backhaul connections based on one or more identifiers of originating integrated access backhaul nodes.

The method and the embodiments related thereto may be implemented in an apparatus implementing a network node, such as an IAB-donor.

On the other hand method and the embodiments related thereto may likewise be implemented in an apparatus comprising means for determining, by an integrated access backhaul donor, information for limiting re-routing of data packets over one or more wireless backhaul connections of an integrated access backhaul network; means for transmitting, by an integrated access backhaul donor to one or more integrated access backhaul nodes of the integrated access backhaul network, the determined information for limiting re-routing of data packets.

According to an embodiment, the apparatus comprises means for determining, by the integrated access backhaul donor, information for limiting re-routing of data packets, based on a network topology and/or routing configurations of the one or more integrated access backhaul nodes, of the integrated access backhaul network.

In an exemplary embodiment, a computer program may be configured to cause a method in accordance with the embodiments described above and any combination thereof.

In an exemplary embodiment, a computer program product, embodied on a non-transitory computer readable medium, may be configured to control a processor to perform a process comprising the embodiments described above and any combination thereof.

In an exemplary embodiment, an apparatus, such as an IAB-node and an IAB-donor, may comprise at least one processor, and at least one memory including computer program code, wherein the at least one memory and the computer program code are configured to, with the at least one processor, cause the apparatus at least to perform the embodiments described above and any combination thereof.

In general, the various embodiments of the invention may be implemented in hardware, circuitry or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as UE or gNB, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

It is to be understood that the embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment. Thus, appearances of the phrases "in/according to one embodiment" or "in/according to an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended examples. However, all such and similar modifications of the teachings of this invention will still fall within the scope of this invention.

The invention claimed is:

1. An apparatus comprising:
   at least one processor; and
   at least one non-transitory memory storing instructions that, when executed by the at least one processor, cause the apparatus to:
   receive, by an integrated access backhaul node from an integrated access backhaul donor, information for limiting re-routing of data packets over one or more wireless backhaul connections of an integrated access backhaul network;
   receive, by the integrated access backhaul node, at least one data packet over a first wireless backhaul connection from an originating integrated access backhaul node;
   re-route, by the integrated access backhaul node, the received at least one data packet over a second wireless backhaul connection based on the received information for limiting re-routing,
   characterized in that re-routing the received at least one data packet comprises
       determine, by the integrated access backhaul node, one or more unallowed wireless backhaul connections for re-routing the received at least one data packet based on the received information for limiting re-routing of data packets;
       determine, by the integrated access backhaul node, a set of available wireless backhaul connections for re-routing the received at least one data packet based on the determined unallowed wireless backhaul connections;
       re-route, by the integrated access backhaul node, the received at least one data packet over at least one wireless backhaul connection of the set of available wireless backhaul connections.

2. The apparatus of claim 1, wherein the instructions, when executed by the at least one processor, cause the apparatus to disable re-routing, by the integrated access backhaul node, over one or more wireless backhaul connections based on the received information for limiting re-routing of data packets.

3. The apparatus of claim 1, wherein the instructions, when executed by the at least one processor, cause the apparatus to re-route, by the integrated access backhaul node, the received at least one data packet based on the received information for limiting re-routing, when one or more conditions for re-routing have been met.

4. The apparatus of claim 1, wherein the instructions, when executed by the at least one processor, cause the apparatus to
   determine, by the integrated access backhaul node, a third wireless backhaul connection for routing the received at least one data packet; and
   re-route, by the integrated access backhaul node, based on the received information for limiting re-routing the received at least one data packet over the second wireless backhaul connection based on at least one of a radio link failure or a congestion on the determined third wireless backhaul connection.

5. The apparatus of claim 1, wherein the instructions, when executed by the at least one processor, cause the apparatus to re-route, by the integrated access backhaul node, the received at least one data packet back to the originating integrated access backhaul node, if the set of available wireless backhaul connections for re-routing the received at least one data packet fails to comprise at least one available wireless backhaul connection.

6. The apparatus of claim 1, wherein the instructions, when executed by the at least one processor, cause the apparatus to
   maintain, by the integrated access backhaul node, re-routing limitation information based on the information indicating one or more re-routing limitations comprising information for limiting re-routing of data packets comprises information indicating one or more re-routing limitations over one or more wireless backhaul connections based on one or more identifiers of originating integrated access backhaul nodes.

7. A method comprising:
receiving, by an integrated access backhaul node from an integrated access backhaul donor, information for limiting re-routing of data packets over one or more wireless backhaul connections of an integrated access backhaul network;
receiving, by the integrated access backhaul node, at least one data packet over a first wireless backhaul connection from an originating integrated access backhaul node;
re-routing, by the integrated access backhaul node, the received at least one data packet over a second wireless backhaul connection based on the received information for limiting re-routing,
characterized in that re-routing the received at least one data packet comprises
  determine, by the integrated access backhaul node, one or more unallowed wireless backhaul connections for re-routing the received at least one data packet based on the received information for limiting re-routing of data packets;
  determine, by the integrated access backhaul node, a set of available wireless backhaul connections for re-routing the received at least one data packet based on the determined unallowed wireless backhaul connections;
  re-route, by the integrated access backhaul node, the received at least one data packet over at least one wireless backhaul connection of the set of available wireless backhaul connections.

8. A non-transitory program storage device readable with a machine, tangibly embodying a program of instructions executable with the machine for performing operations, the operations comprising:
receiving, by an integrated access backhaul node from an integrated access backhaul donor, information for limiting re-routing of data packets over one or more wireless backhaul connections of an integrated access backhaul network;
receiving, by the integrated access backhaul node, at least one data packet over a first wireless backhaul connection from an originating integrated access backhaul node;
re-routing, by the integrated access backhaul node, the received at least one data packet over a second wireless backhaul connection based on the received information for limiting re-routing,
characterized in that re-routing the received at least one data packet comprises
  determine, by the integrated access backhaul node, one or more unallowed wireless backhaul connections for re-routing the received at least one data packet based on the received information for limiting re-routing of data packets;
  determine, by the integrated access backhaul node, a set of available wireless backhaul connections for re-routing the received at least one data packet based on the determined unallowed wireless backhaul connections;
  re-route, by the integrated access backhaul node, the received at least one data packet over at least one wireless backhaul connection of the set of available wireless backhaul connections.

* * * * *